(12) United States Patent
Herzfeld et al.

(10) Patent No.: US 6,437,700 B1
(45) Date of Patent: Aug. 20, 2002

(54) GROUND FAULT CIRCUIT INTERRUPTER

(75) Inventors: David Herzfeld, Huntington; Frantz Germain, Rosedale; John J. Power, Westbury; Armando Calixto, Floral Park, all of NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 09/688,481

(22) Filed: Oct. 16, 2000

(51) Int. Cl.[7] ................................................ H02H 3/16
(52) U.S. Cl. ........................ 340/650; 340/635; 340/653; 340/654; 340/657; 335/18; 361/42; 361/43; 361/44; 361/45-50
(58) Field of Search ................................ 340/650, 653, 340/654, 657, 635; 335/18; 361/42-50

(56) References Cited

U.S. PATENT DOCUMENTS

| | | | |
|---|---|---|---|
| 5,594,398 A | * 1/1997 | Marcou et al. | 335/18 |
| 5,600,524 A | * 2/1997 | Neiger et al. | 361/42 |
| 5,694,280 A | * 12/1997 | Zhou | 361/45 |
| 5,847,913 A | * 12/1998 | Turner et al. | 361/93 |
| 5,933,063 A | * 8/1999 | Keung et al. | 335/18 |
| 5,963,408 A | * 10/1999 | Neiger et al. | 361/45 |

* cited by examiner

Primary Examiner—Jeffery Hofsass
Assistant Examiner—Hung Nguyen
(74) Attorney, Agent, or Firm—Paul J. Sutton

(57) ABSTRACT

A signaling system employing indicator lamp means and an audible alarm is employed to remind a user to periodically test his GFCIs and to provide information regarding the status of the GFCI. The power lines that supply the GFCI with power are also coupled to the circuits on the PCB to disconnect power to those circuits of the GFCI that trips due to faults or tests.

18 Claims, 19 Drawing Sheets

| MODE | LED INDICATOR | | | PIEZO BEEPER |
|---|---|---|---|---|
| | GREEN | RED | AMBER | |
| SUPERVISORY | SLOW | NA | NA | OFF |
| 25 DAYS | FAST | NA | NA | OFF |
| 30 DAYS | NA | NA | FAST | OFF |
| TRIP-EXTERNAL FAULT | NA | NA | FAST | ON |
| FAULT IN GFCI | NA | FAST | NA | ON |
| POWER ON RESET | NA | NA | FAST | OFF |

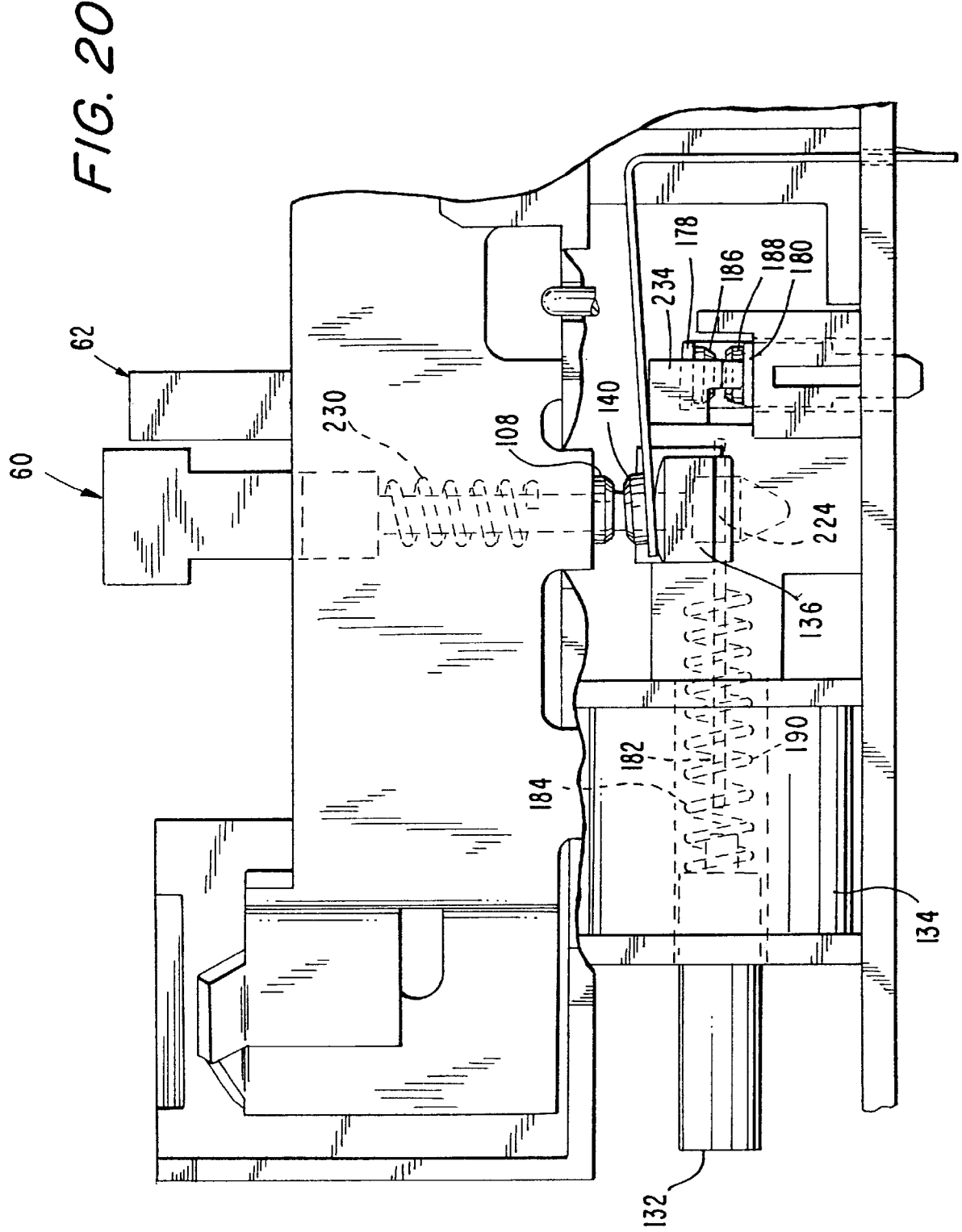

GROUND FAULT CIRCUIT INTERRUPTER

FIELD OF THE INVENTION

The invention pertains to ground fault circuit interrupters (GFCIs) and more particularly to a GFCI which employs a combination of colored lights and an audible alarm signal to shown various states of the GFCI and designate time periods for taking certain actions.

DESCRIPTION OF THE PRIOR ART

Present GFCI's generally provide no information to the user as to the status of the GFCI. One GFCI currently on sale provides a single LED to show that the device is operating, that is that the main switch contacts are closed.

SUMMARY OF THE INVENTION

The present invention provides a GFCI that gives the user a great deal of information on the status of the GFCI and the circuit it is to protect. The GFCI includes a dual color lamp which can produce three distinct colors. Further, the lamp is intended to be blinked at a first slow rate or a second higher rate. An audible alarm can be operated or maintained silent. The information given the user will depend upon the color of the lamp, the speed at which it is blinked and the presence or absence of an audible alarm signal. It is an object of the instant invention to provide a novel GFCI.

It is another object of the instant invention to provide a novel GFCI with signaling means to show the status of the GFCI and associated circuits.

It is another object of the instant invention to provide a novel GFCI with signaling means comprising blinking colored lights and an audible alarm to show the status of the GFCI and associated circuits.

Other objects and features of the invention will be pointed out in the following description and claims and illustrated in the accompanying drawings, which disclose, by way of example, the principles of the invention, and the best mode which is presently contemplated for carrying them out.

BRIEF DESCRIPTION THE DRAWING

In the drawing in which similar elements are given similar reference characters:

FIG. 20 is a side elevational view of the device of FIG. 19.

DESCRIPTION OF THE PREFERRED EMBODIMENT

Figure 1:
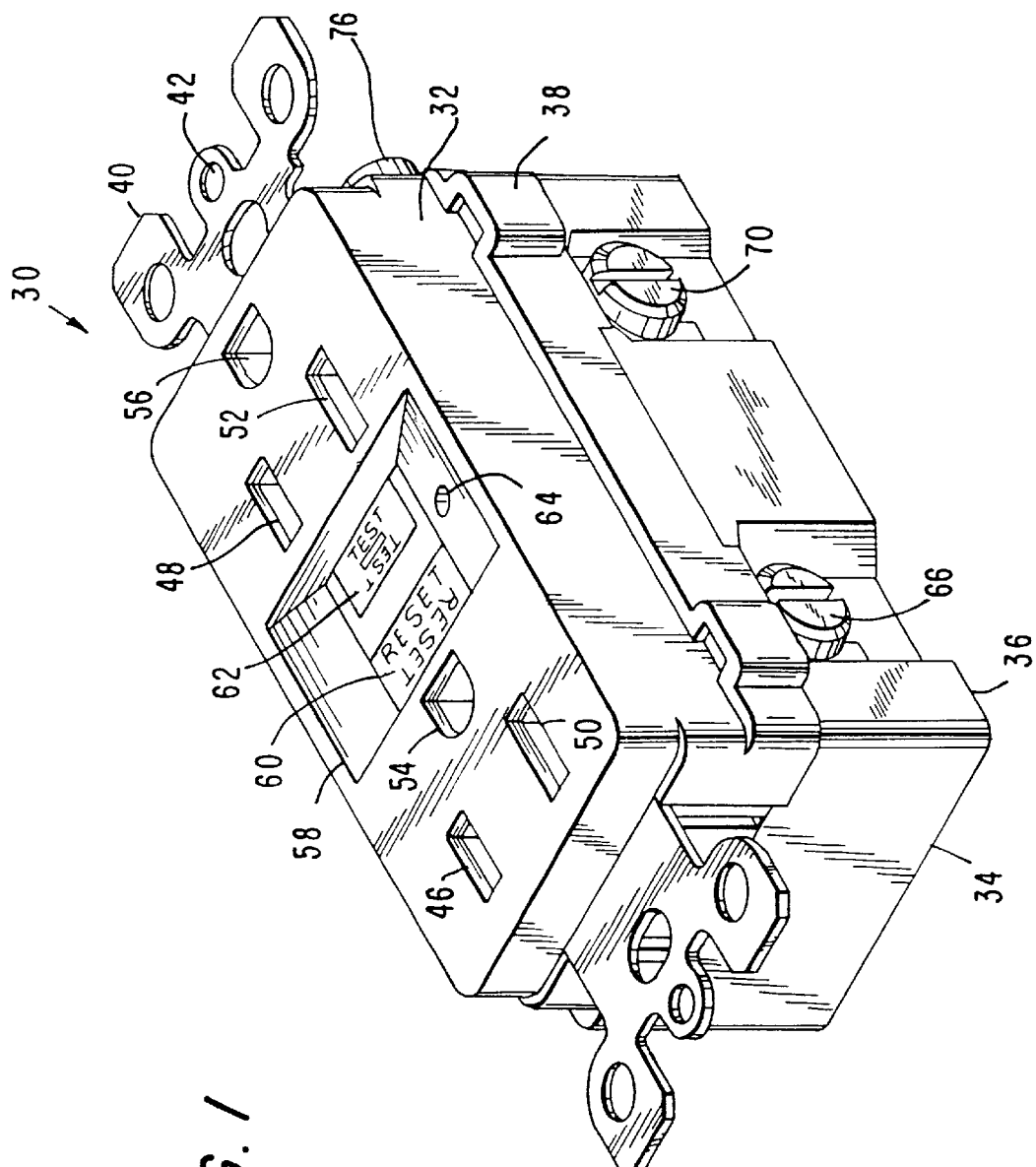
FIG. 1 is a perspective view of a GFCI constructed in accordance with the concepts of the invention.
Figure 2:
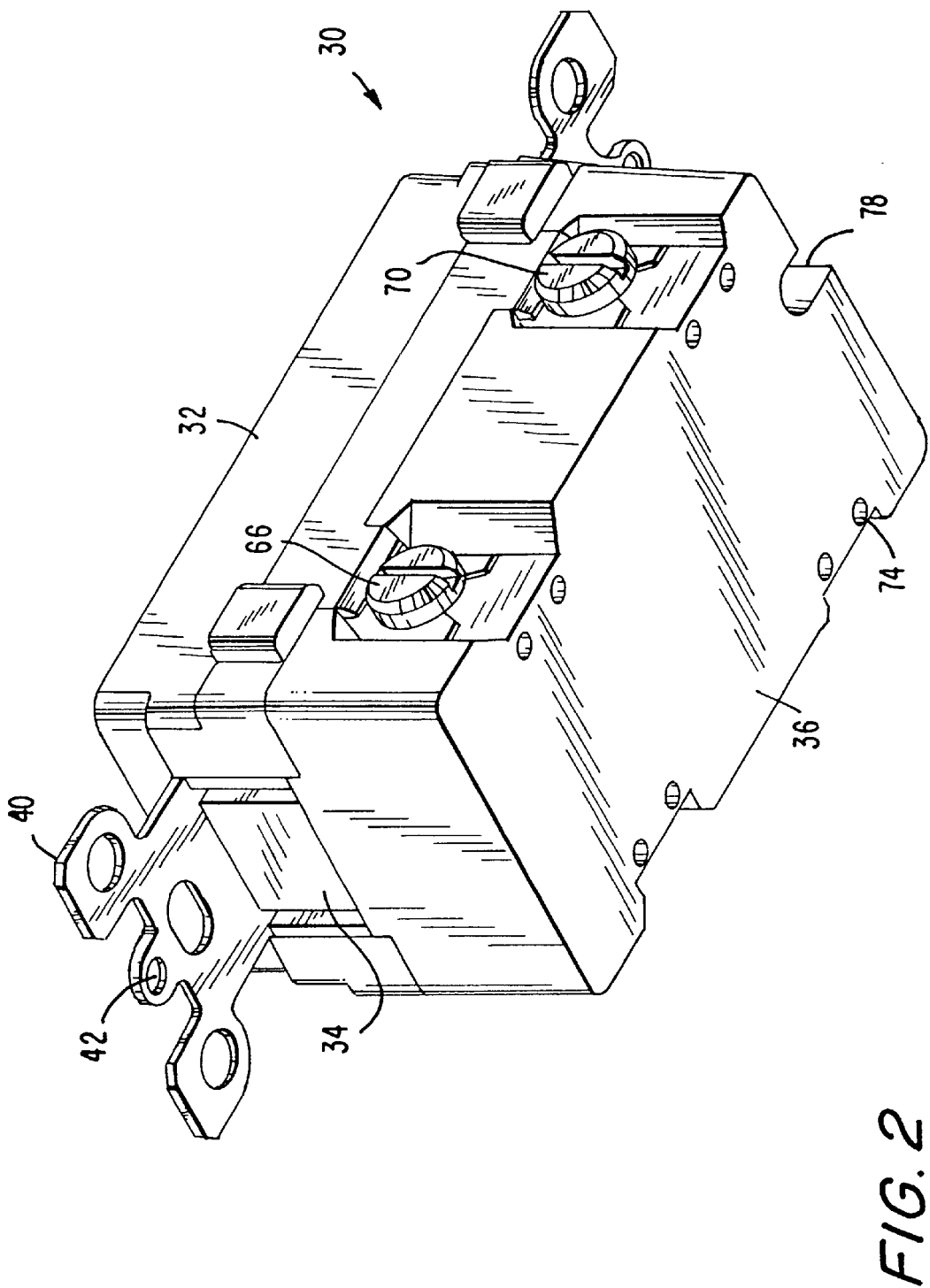
FIG. 2 is a bottom perspective view of the GFCI of FIG. 1.

Turning now to FIGS. 1 and 2, a complete GFCI 30 constructed in accordance with the concepts of the invention is shown.

GFCI 30 is made up of a top cover 32, middle housing 34 and a bottom housing 36 held in assembly by the deflectable tabs (not shown) on bottom housing 36 engaging the U-shaped members 38 on top cover 32. A mounting strap 40 is mounted between top cover 32 and middle housing 34 and has two apertures 42 to mount the GFCI 30 to the mounting ears of a standard gang box (not shown). Top cover 32 has a face 44 which contains two sets of slots each to receive a three-bladed grounded plug (not shown). Each set of slots is made up of a slot 46, 48 of a first length and a slot 50, 52 of a longer length and a U-shaped slot 54, 56 to receive the grounding prong of the plug. Because the slots 50, 52 are longer than the slots 46, 48 the plug is naturally polarized and conforms to NEMA standard 5-15R. In the depression 58 in top cover 32 is placed a reset button 60, a test button 62 and an indicator lamp means 64. Indicator lamp means 64 is a dual color lamp which produces a first color when a first filament is activated, a second color when a second filament is activated and a third color when both filaments are activated. Bottom housing 36 has a series of four terminal screws (only two of which are shown in the figures). Terminal screw 66 is connected to the load neutral terminal as will be described below. A similar terminal screw 68 is connected to the load phase terminal. Terminal screw 70 is connected to the line neutral terminal and a similar terminal screw 72 is connected to the line phase terminal as will be described below. Adjacent each terminal screw 66, 68, 70 and 72 are two apertures 74 to receive the bared ends of electrical conductors (not shown). As will be described below, the conductor ends extend between a terminal contact and a wire nut which engages the conductor and pushes it against the terminal contact as the terminal screw is advanced. At the rear wall of middle housing 34 is a grounding screw 76 to which may fastened a ground conductor (not shown inserted into slot 78.)

Figure 3:
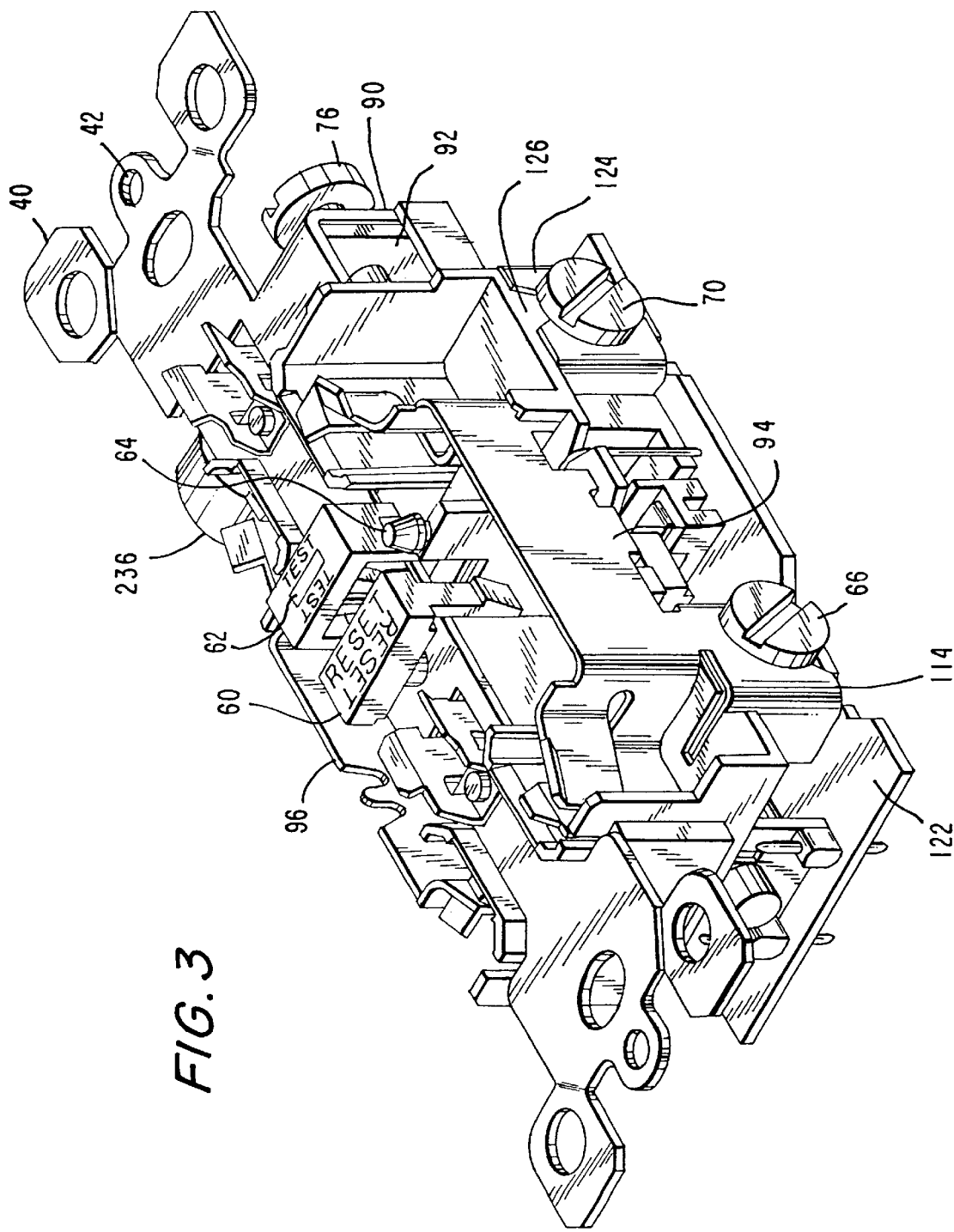
FIG. 3 is similar to FIG. 1 but with the top and bottom covers of the GFCI removed.
Figure 4:
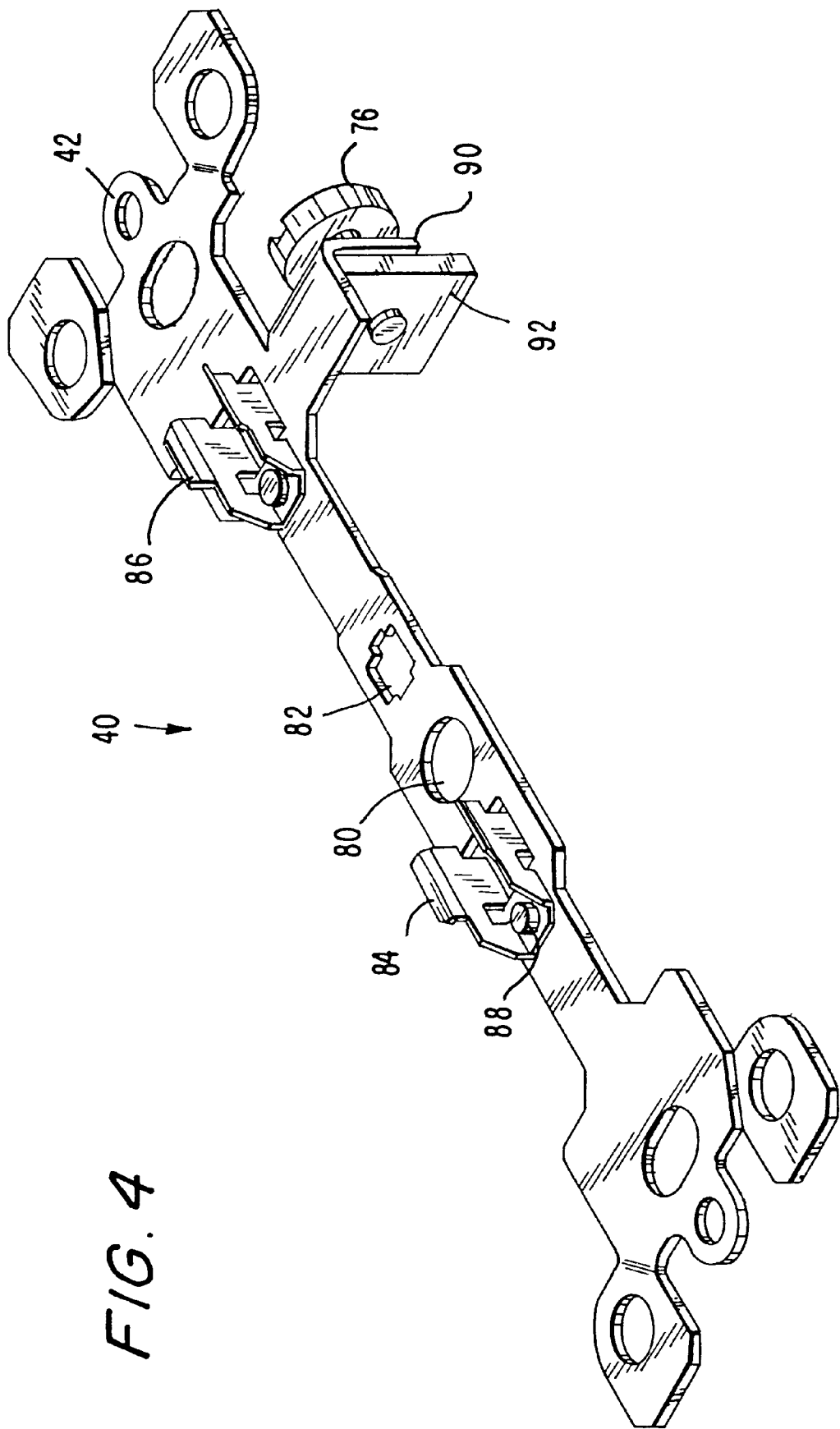
FIG. 4 is a perspective view of the mounting strap of the device of FIG. 1.

Turning now to FIG. 3 which shows GFCI 30 with the top cover 32 and the bottom housing 36 removed and FIGS. 4 and 5 which show details of the mounting strap 40 and the load phase and neutral terminals. Mounting strap 40 has two apertures 42 as above described and a generally centrally located circular opening 80 to receive the reset lever and a square opening 82 to receive the test lever. Two clips 84, 86 are arranged to engage the grounding prong of inserted plugs and are connected to mounting strap 40 by rivets 88. A bent down tab 90 has a threaded aperture to receive the ground screw 76. A ground nut 92 is pulled against tab 90 as ground screw 76 is advanced to hold the bared end of a conductor inserted in slot 78 and between tab 90 and ground nut 92.

Figure 5:
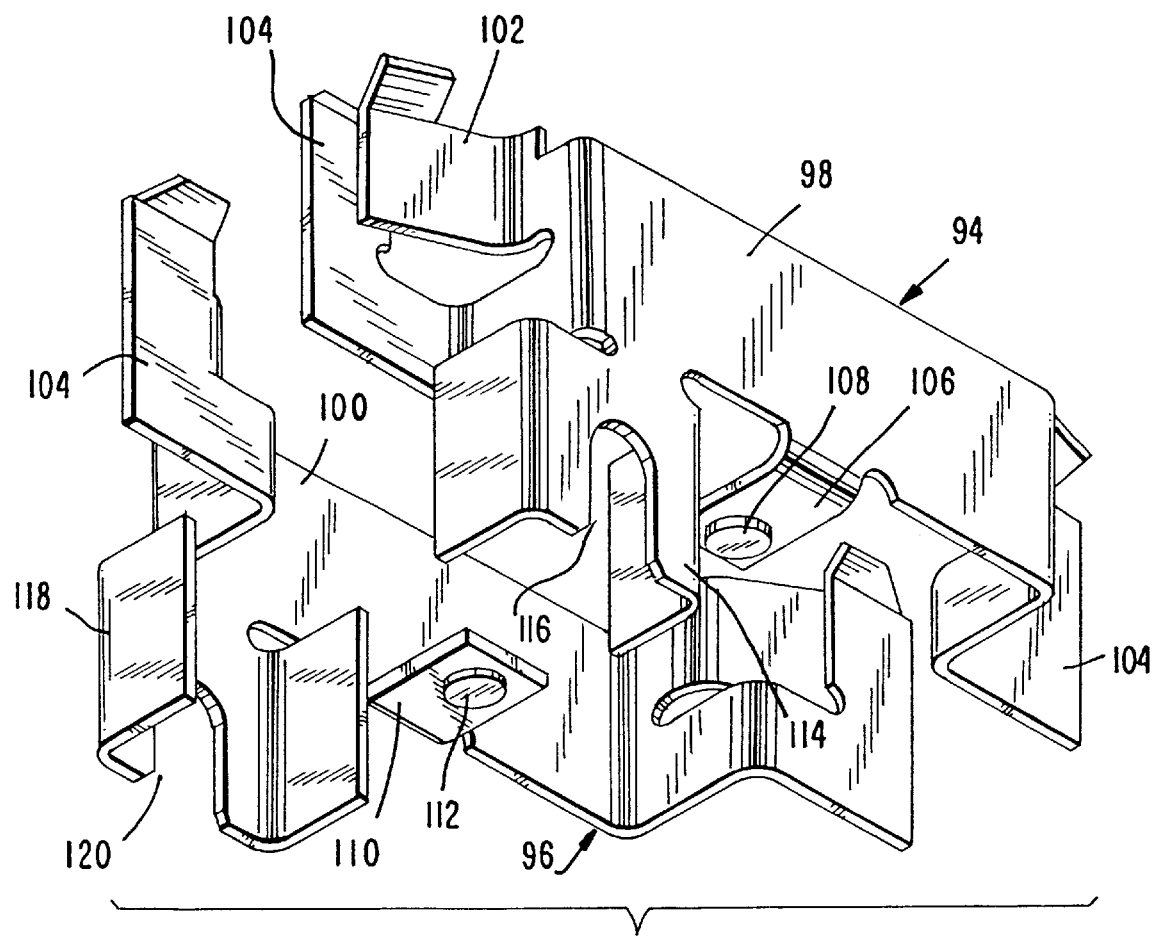
FIG. 5 is a bottom perspective view of the load neutral and load phase terminals of the device of FIG. 1.

FIG. 5 shows the load neutral terminal 94 and the load phase terminal 96. Each terminal 94, 96 has a central body portion 98, 100, respectively, with male blade grip fingers 102, 104 at each end. The male blades of the plug with fit between each pair of grip fingers 102, 104 to make mechanical and electrical contact with the male blades of the inserted plug. An interned tab 106 on load neutral terminal 94 receives the main fixed neutral contact 106 while interned tab 110 receives the main fixed phase contact 112. A depending three sided tab 114 has a slot 116 to receive therethough the threaded portion of terminal screw 66. A similar depending three sided tab 118 has a slot 120 to receive therethrough the threaded portion of terminal screw 68.

In FIG. 3 the mounting strap 40 of FIG. 4 and the terminals 94, 96 of FIG. 5 are shown assembled to middle housing 34. Also mounted to middle housing 34 is the printed circuit board (hereafter PCB) 122 which contains the various circuits which determine the indicator lamp means color, its blinking rate and control the beeper. The PCB 122 also contains the various components of the fault detectors, transformers and solenoid as will be described below. Terminal screw 70 is connected to a tab 124 having a slot 126 therein to receive the threaded portion of terminal screw 70. A similar structure is present for terminal screw 72 not visible in the figure.

Figure 6:
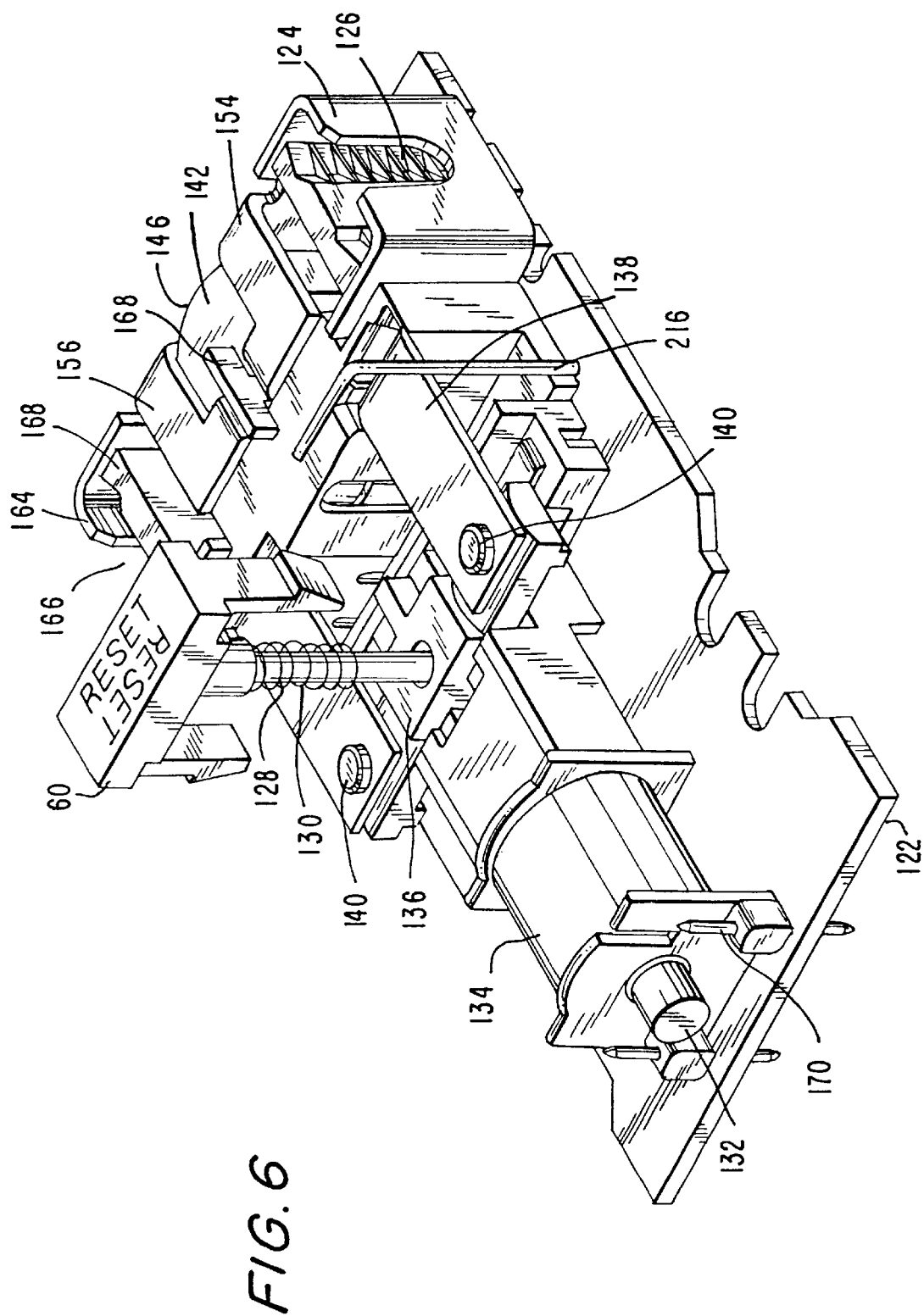
FIG. 6 is a perspective view of the printed circuit board and reset assemblies of the device of FIG. 1.
Figure 7:
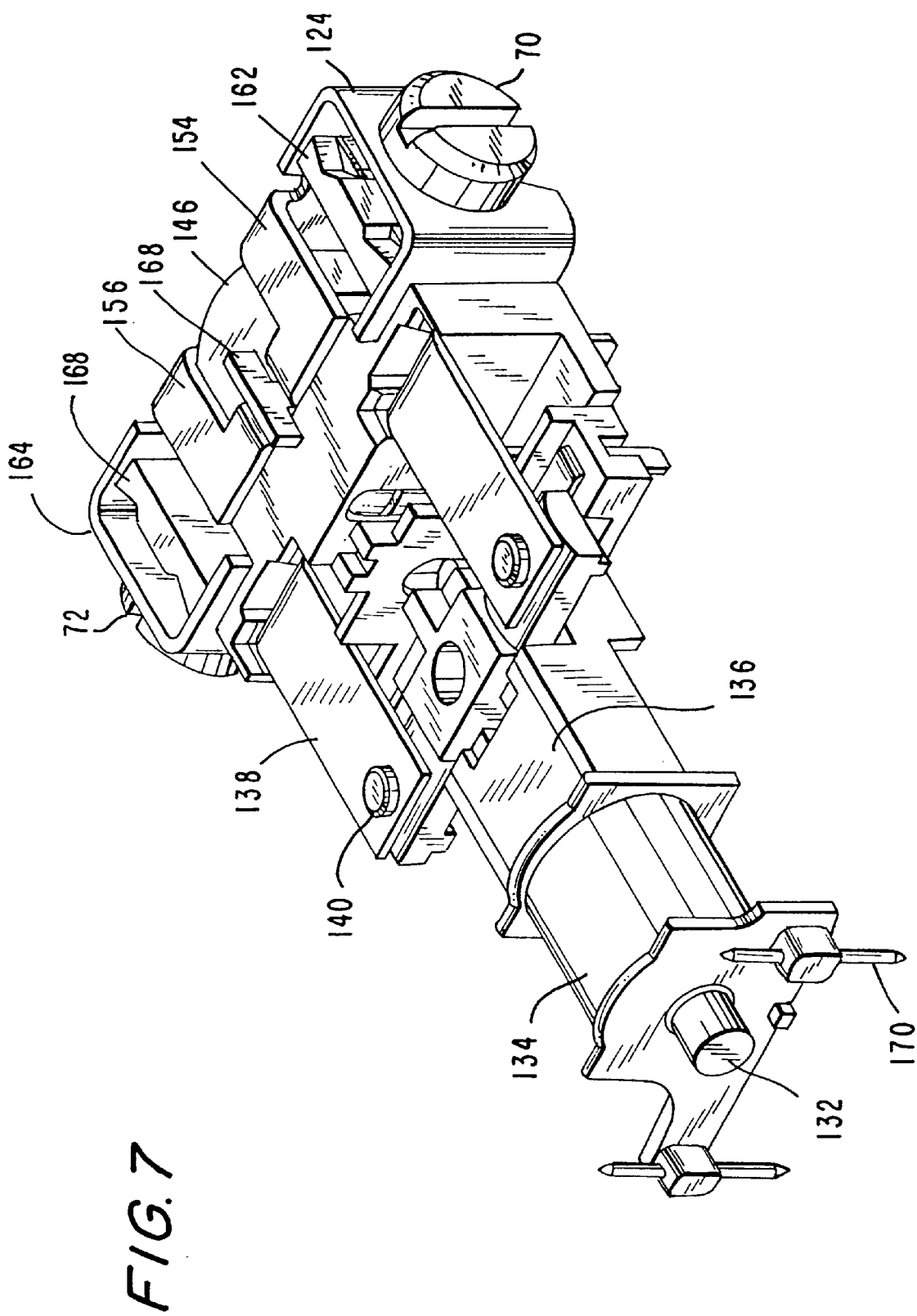
FIG. 7 is a perspective view of the devices of FIG. 6 with the reset lever and PC board removed.
Figure 11:
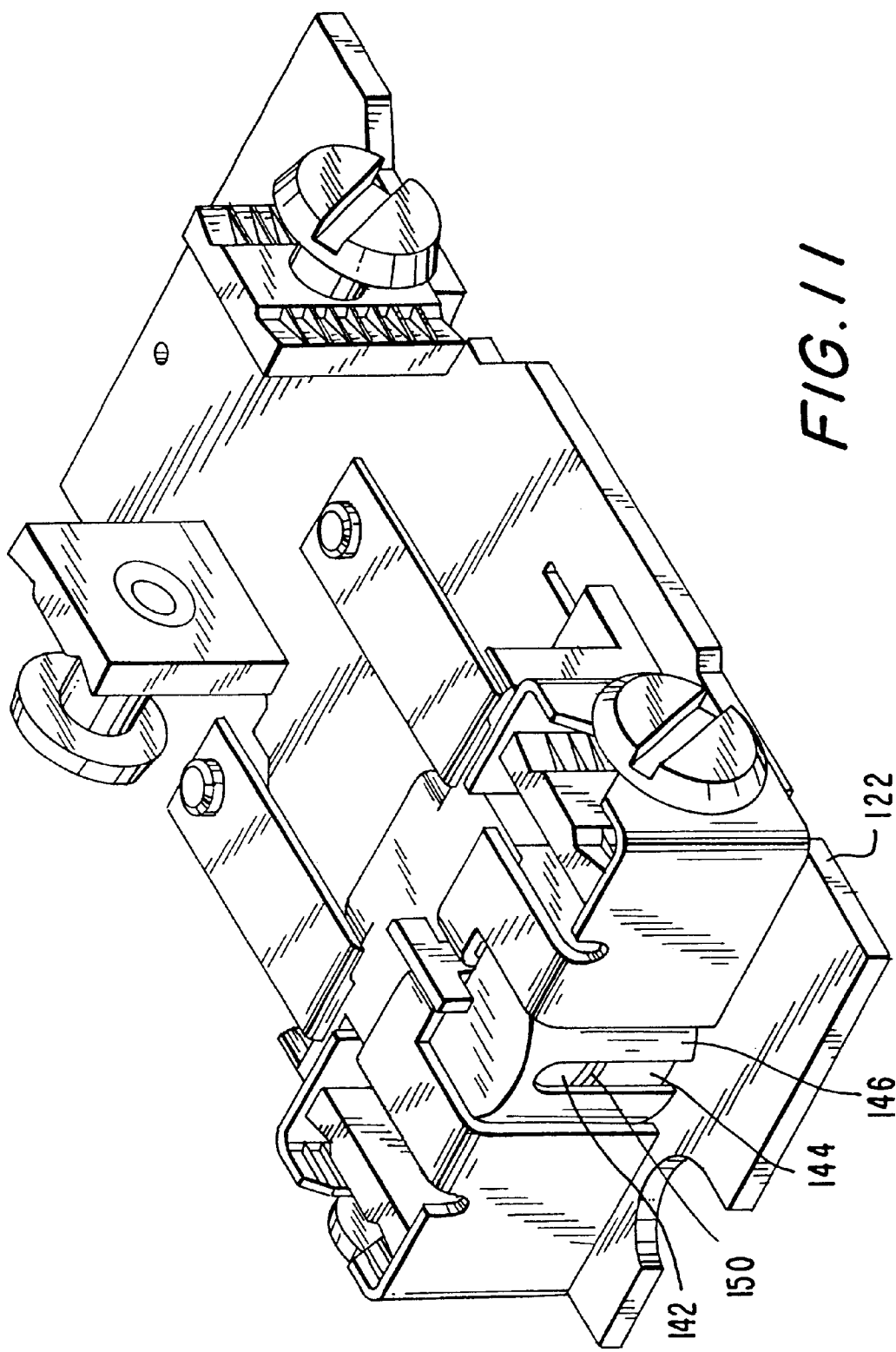
FIG. 11 is a perspective view showing the transformers mounted on the printed circuit board of the device of FIG. 1.
Figure 12:
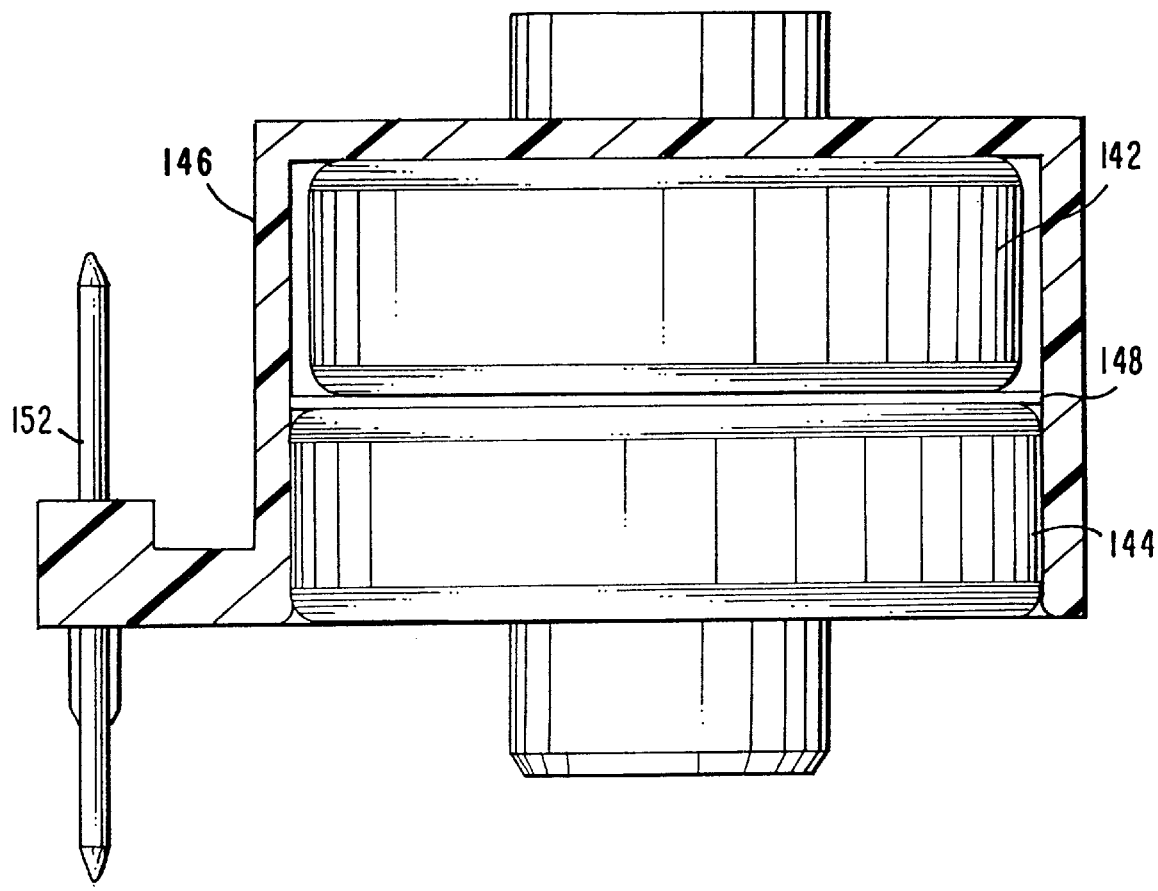
FIG. 12 is a side elevational view partly in section of the transformer bracket assembly of FIG. 11.

Referring now to FIG. 6 the PCB 122 assembly and the reset assembly are shown with the middle housing 34 removed. The reset assembly comprises a reset button 60, a reset lever 128 and a reset spring 130 and a latch pin to be described below with respect to FIGS. 16 to 20. A plunger 132 is positioned in the passageway of a solenoid coil 134. The plunger 132 is shown in its reset position extending partially out of the passageway of solenoid coil 134. When the solenoid coil 134 is operated by the circuits on the PCB 122 the plunger 132 is drawn further into solenoid coil 134. The plunger 132 controls the position of the latch plate to be described with reference to FIG. 10. The latch plate in cooperation the latch pin and reset spring 130 move the lifter 136 upwardly against the movable contact arms 138 to close the main movable contacts 140 to the main fixed contacts 108, 112 on the underside of interned tabs 106, 110, respectively. The movable contact arms 138 are biased away from their associated interned tabs 106, 110 and when the latch pin has been released push the lifter 136 and latch plate downwardly to move the movable contacts 140 away from their associated fixed contacts 108, 112. Also mounted on the PCB 122 is a neutral transformer 142 and a differential transformer 144. Only the neutral transformer 142 is shown in FIG. 6. Both transformers and the transformer bracket assembly 146 are shown in FIG. 12. Neutral transformer 142 is stacked upon differential transformer 144 with a fiber washer 148 therebetween. The bracket assembly 146 substantially surrounds the transformers 142, 144 except for a slot 150 as shown in FIG. 11 and slots into which conductors are placed. The leads for the windings of the transformers are brought out to four transformer pins 152 to which may be coupled the line and load conductors. One of the transformers will sense the current going to the load from the source and the other will sense the current from the load back to the source. Any difference in current through these transformers is an indication that there is a fault in the circuit wiring. A device which can measure small differences in current and supply a fault signal is an integrated circuit available from many sources, for example, type number LM1851 from National Semiconductor or type number MC3426 from Motorola. This IC is located on PCB 122. The line neutral terminal 154 and the line phase terminal 156 have arms 158, 160 (see FIG. 9) which extend through the slots in the top of transformer bracket assembly 146. As shown in FIG. 7, terminal screw 70 extends through slot 126 of tab 124 that is part of line neutral terminal 154 and into a threaded aperture in nut 162 to thus connect the line neutral conductor (not shown) to the two transformers. The arms 158,160 act as one turn windings for the transformers 142 and 144. The line phase conductor (not shown) is connected via terminal screw 72 to tab 164 which extends through a slot 166 in tab 164 into the threaded aperture of a nut 168. Tab 162 is part of the line phase terminal 156. An insulator 168 extends between the arms 158, 160 to prevent shorting between them. The solenoid coil 134 is connected to two bobbin pins 170 to permit connection to PCB 122. FIG. 7 is similar to FIG. 6 but omits the PCB 122, the reset button 60, the reset lever 128 and the reset spring 130.

Figure 8:
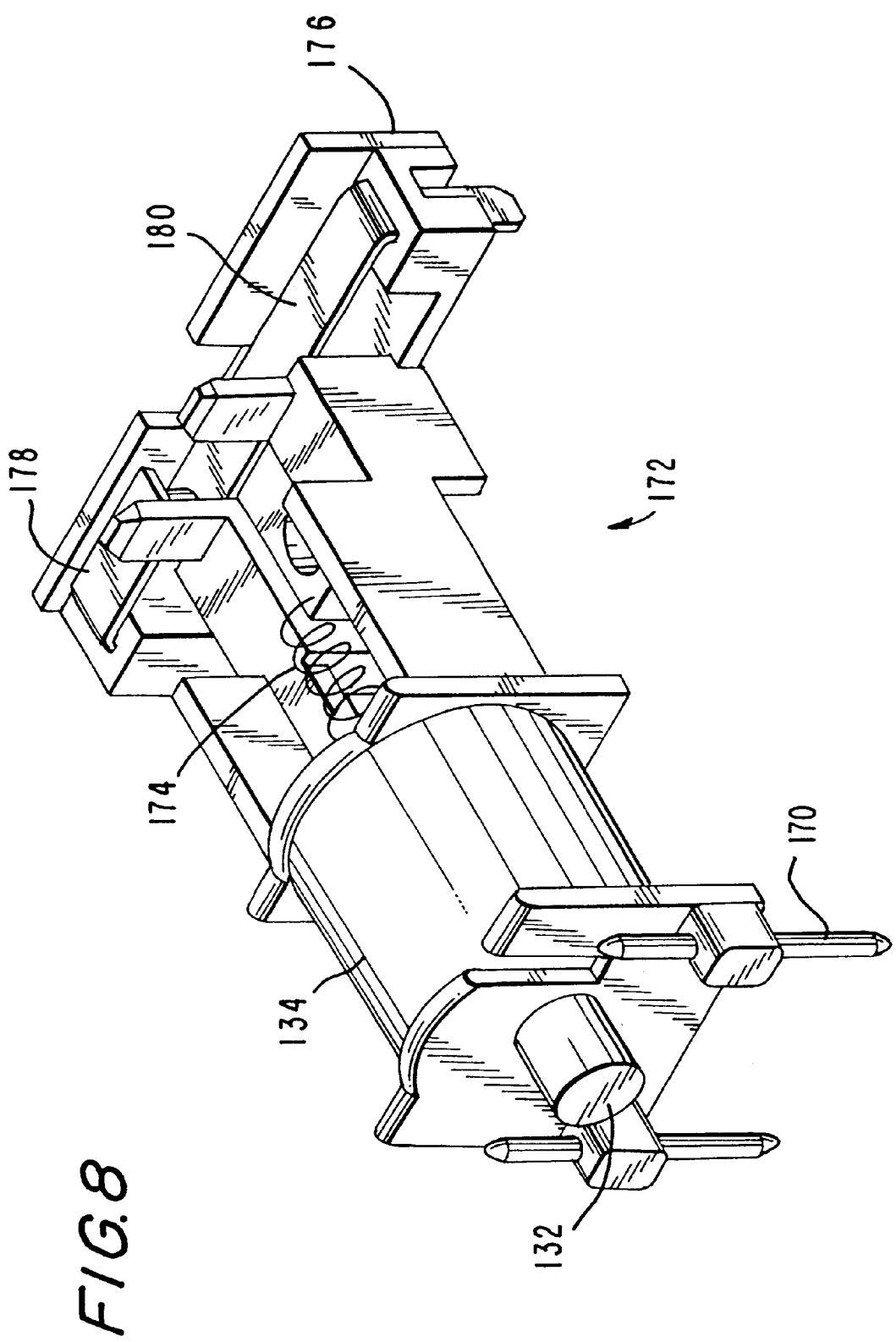
FIG. 8 is a perspective view of the bobbin assembly of the device of FIG. 1.

FIG. 8 shows the bobbin assembly 172 having solenoid coil 134 connected to bobbin pins 170 and containing plunger 132 in its passageway. A chamber 174 receives the lifter 136 and supports the lifter 136 when in its low position. A cross member 176 supports the auxiliary switch made up of auxiliary fixed contact arm 178 and auxiliary movable contact arm 180. The auxiliary switch when auxiliary fixed contact 186 and auxiliary movable contact 188 are engaged provides power to various components on the PCB 122. The auxiliary switch, when auxiliary fixed contact 186 and auxiliary movable contact 188 are not engaged cut-off the power to the components on PCB 122 and prevent possible damage to the PCB 122 components. For example, if the signal to the solenoid coil 134 were repeatedly applied while the main contacts are open there is a chance to burn out the solenoid coil 134. The auxiliary movable contact arm 180 is biased towards auxiliary fixed contact arm 178 and will engage it unless forced to open the contacts.

Figure 9:
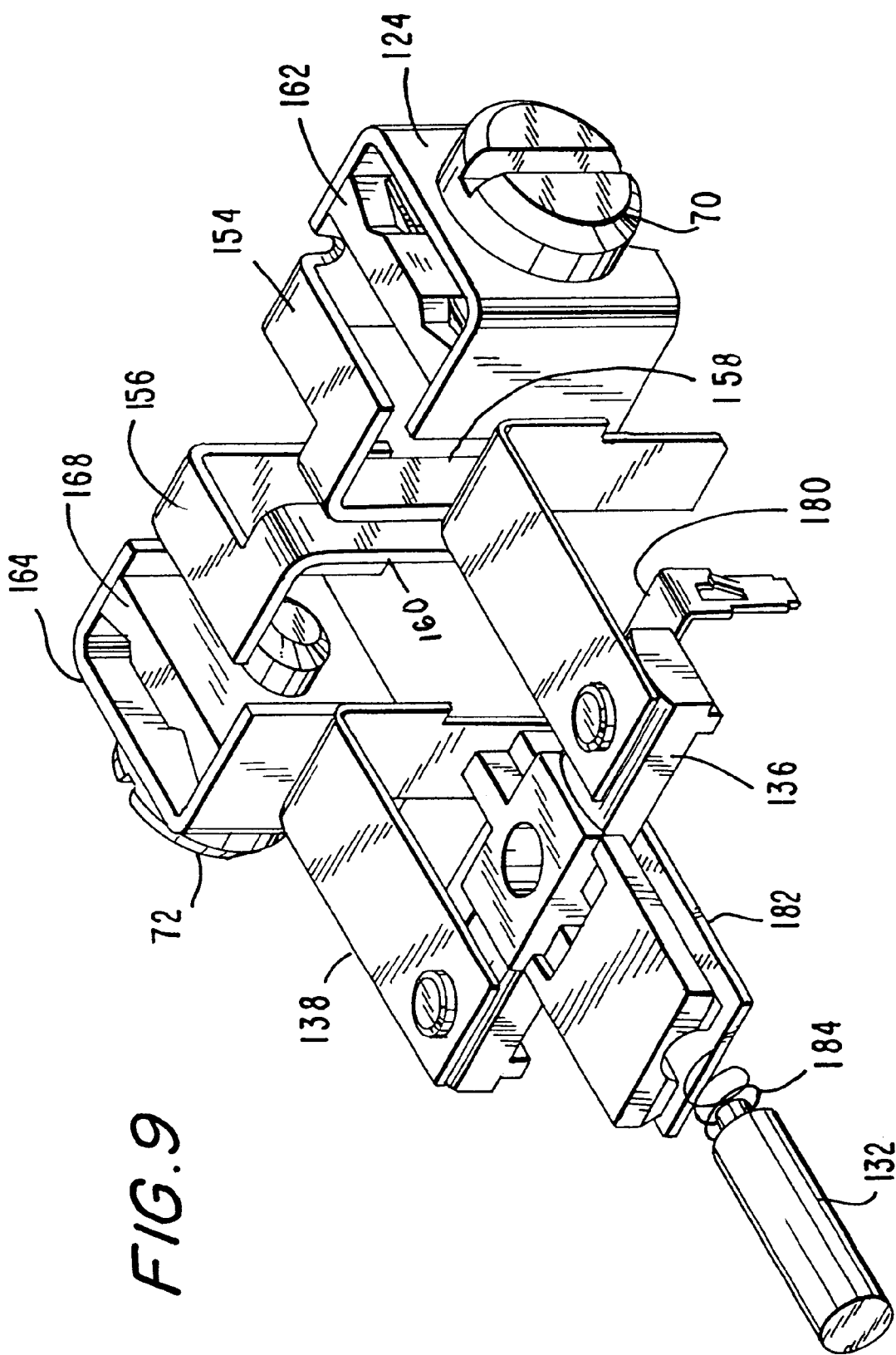
FIG. 9 is a perspective view of the main movable contacts of the device of FIG. 1.

FIG. 9 shows the lifter 136 in contact with the movable contact arms 138 and positioned by the latch plate 182 which in turn is controlled by the plunger 132 and the plunger reset spring 184. The lifter 136 and latch plate 182 positions are dependent upon the reset lever 128 position as will be described below. The lifter 136 also controls the auxiliary movable contact arm 180. When the lifter 136 in its low position, the auxiliary movable contact 188 is moved away from contact with the auxiliary fixed contact 188 (not shown). A latch plate return spring (not shown) resets the latch plate once the plunger 132 is reset as will be set out with respect to FIG. 10.

Figure 10:
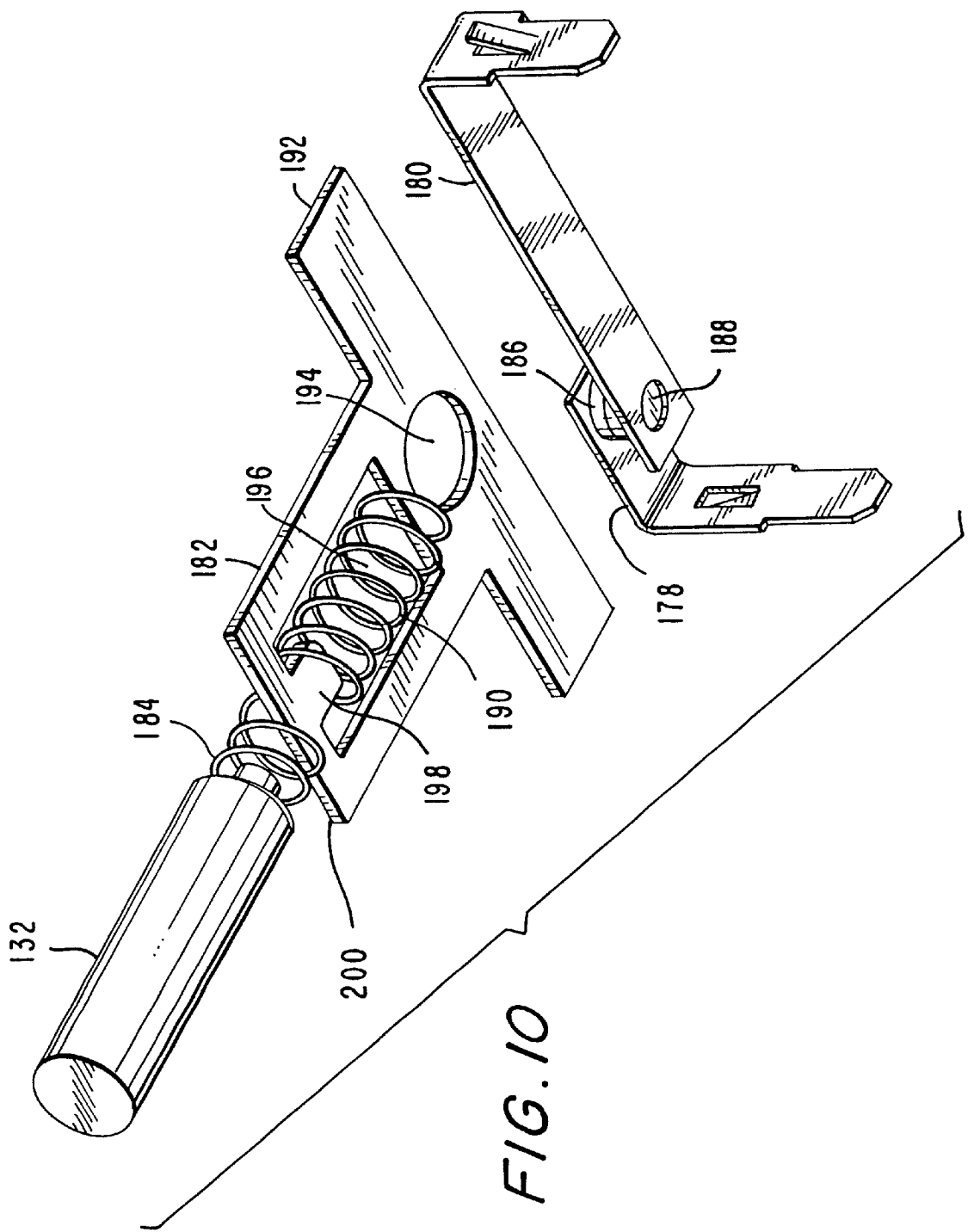
FIG. 10 is a bottom perspective view of the plunger, latch plate and auxiliary contacts of the device of FIG. 1.

In FIG. 10 there is shown the latch plate 182, the plunger 132 and the auxiliary fixed arm 178 with auxiliary fixed contact 186 and the auxiliary movable arm 180 with auxiliary movable contact 188. Plunger reset spring 184 is anchored on the back edge 200 of latch plate 182 and the tab 198 extending into the rectangular opening 196. When the plunger 132 is moved to the right in FIG. 10 as a result of the activation of solenoid coil 134 the plunger reset spring 184 is compressed and expands to return the plunger 132 to its initial position partially out of the solenoid coil 134 as shown in FIG. 6 when the solenoid coil 134 is deactivated. Latch plate return spring 190 is connected between lifter 136 and tab 198 and is compressed by the movement of latch plate 182 to the right in FIG. 10 due to movement of plunger 132 to the right as well. When the plunger 132 is withdrawn, the latch plate return spring 190 expands to return the latch plate 182 to the left in FIG. 10. The arms 192 support arms of lifter 136. A central aperture 194 is oval in shape with its longer axis extending along a central longitudinal axis of latch plate 182. At the center of aperture 194, the aperture 194 is large enough for a latch pin (not shown) to pass through aperture 194 and move without engaging the lifter 136. At one of the smaller ends the latch pin is held by the latch plate 182 and causes the lifter 136 to move with the latch pin as will be described below. The auxiliary movable arm 180 is biased upwardly so that it brings auxiliary movable contact 188 into contact with auxiliary fixed contact 186 on auxiliary fixed arm. 178. As will be described below an arm of the lifter 136 will engage the auxiliary movable arm 180 to push it downwardly in FIG. 10 to separate the auxiliary movable contact 188 from the auxiliary fixed contact 186 and open the auxiliary circuit.

Figure 13:
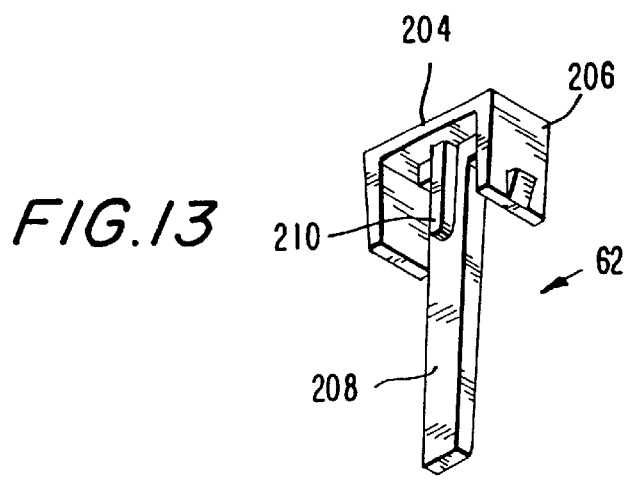
FIG. 13 is a perspective view of the test lever and button of the device of FIG. 1.
Figure 14:
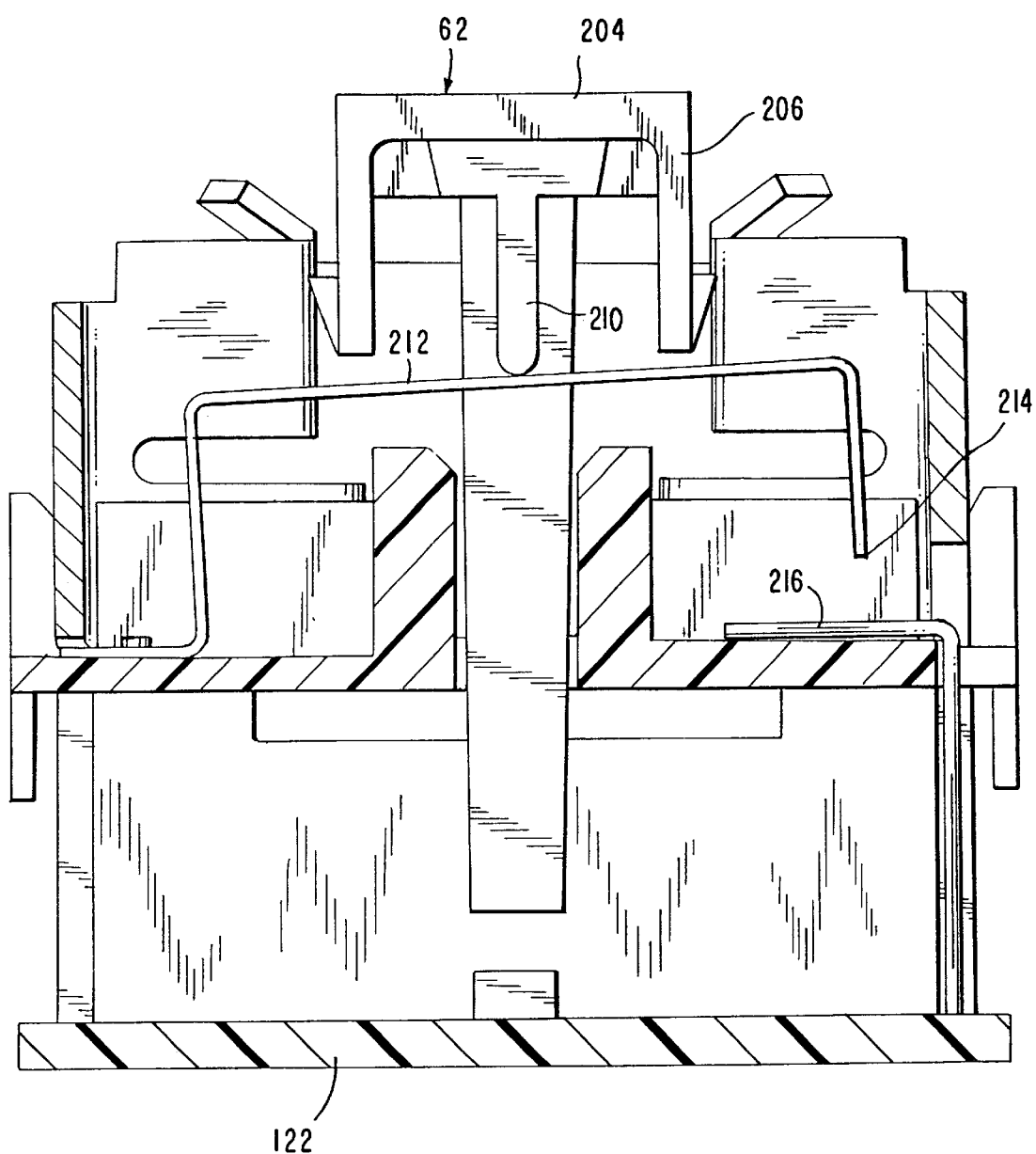
FIG. 14 is front elevational view of the test lever, test button, test arm and test pin in the open position.
Figure 15:
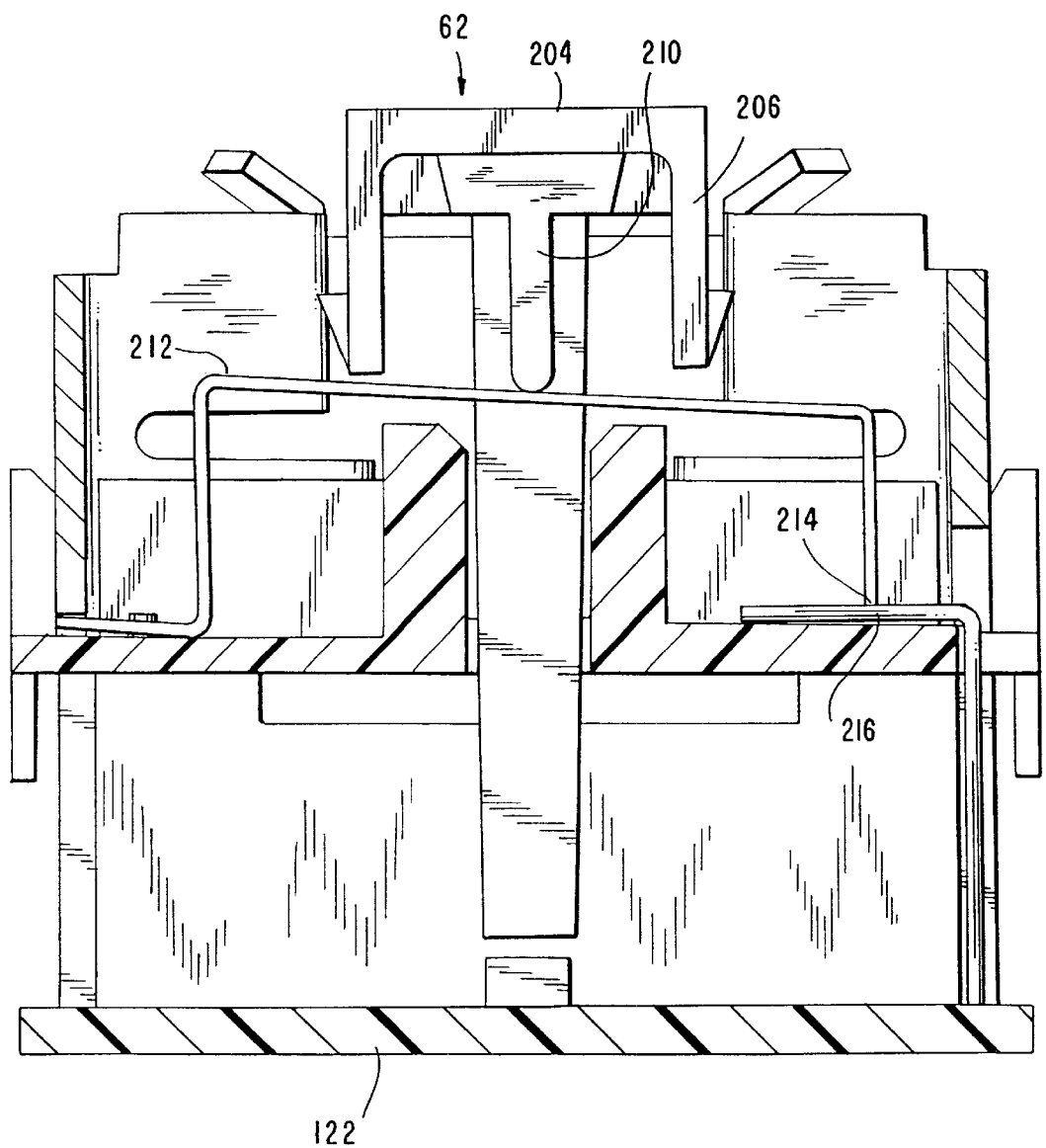
FIG. 15 is a front elevational view of the components shown in FIG. 14 in the closed, test position.

Turning now to FIGS. 13, 14 and 15 the test button 62 is shown and its operation described. Test button 62 has a top member 204 from which extend side members 206. Also extending from top member 204 is a central lever 208 which contains a cam 210. The lever 208 extends through square opening 82 in mounting strap 40. The cam 210, when the test button 62 is depressed, engages a test arm 212 and moves its free end 214 into contact with test pin 216. The position of the test pin 216 is shown in FIG. 6. The test pin 216 is coupled to a small resistor and a lead which extends through one of the transformers 142, 144 to produce an unbalance in the power lines and cause the integrated circuit LM1851 to produce a signal to operate the solenoid 134 and thus simulate a fault. The test button return spring (not shown) returns the test button 62 to its initial position. FIG. 14 shows the reset position of test button 64 with cam 210 not depressing test arm 212 and the free end 214 separated from test pin 216. When the test button 62 is depressed as shown in FIG. 15, the cam 210 forces the free end 214 of test arm 212 downwardly into contact with test pin 216 to cause a simulated fault and operate the GFCI 30 to determine that the GFCI 30 is working properly. When released test button 62 returns to its reset position as shown in FIG. 14.

Figures 16, 21:
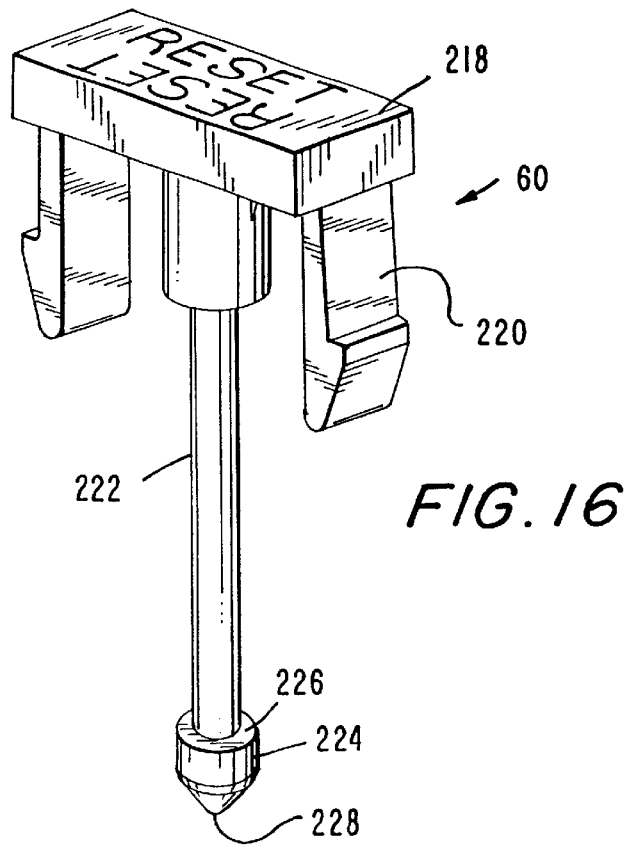
FIG. 16 is a perspective view of the reset lever and reset button of the device of FIG. 1.
FIG. 21 is a table to show the relationships between the status of the GFCI and associated circuits and the color, speed of blinking and the presence or absence of an audible signal.
Figure 17:
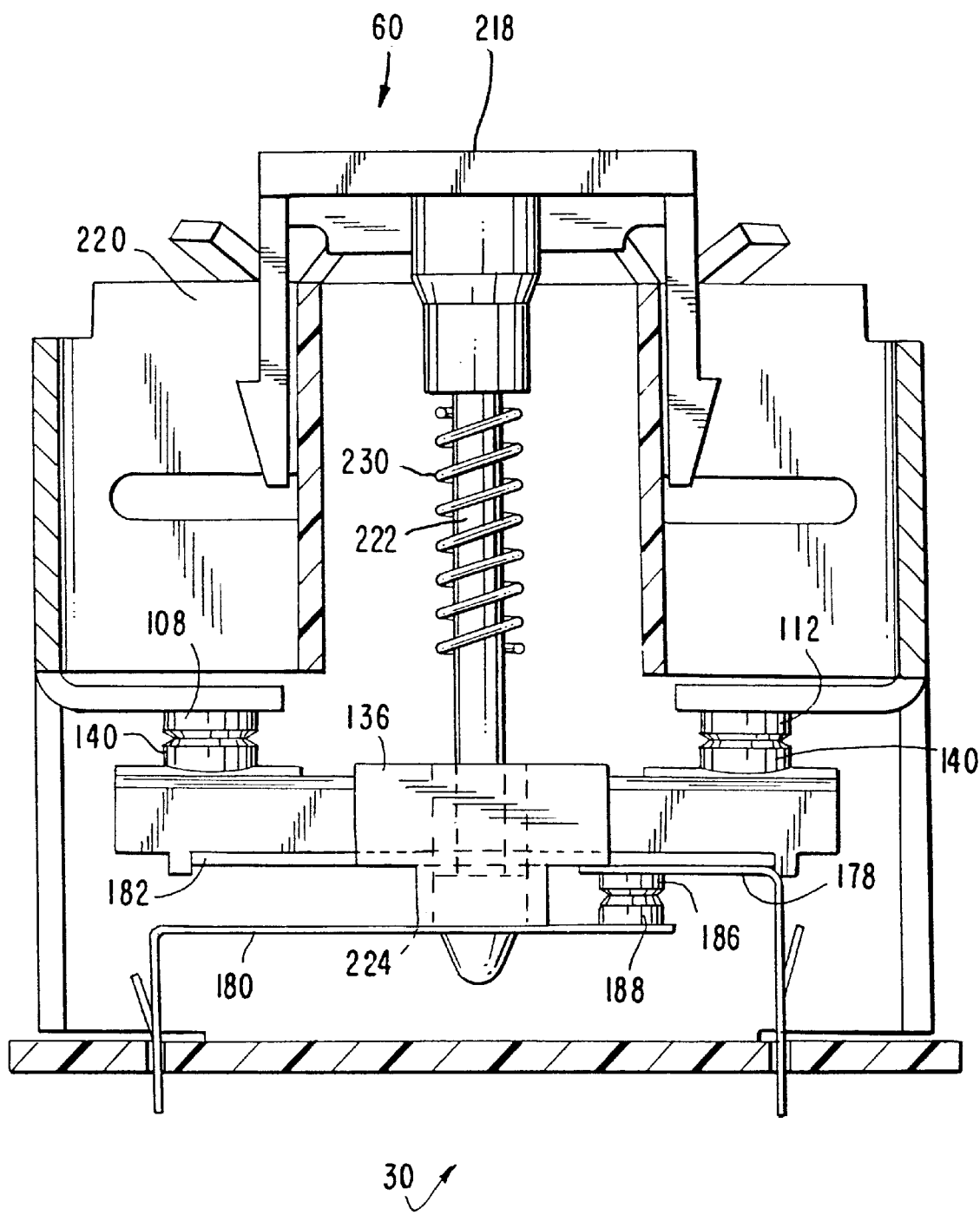
FIG. 17 is a front elevational view of the reset lever reset button, main contacts and auxiliary contacts in the closed or reset condition.
Figure 18:
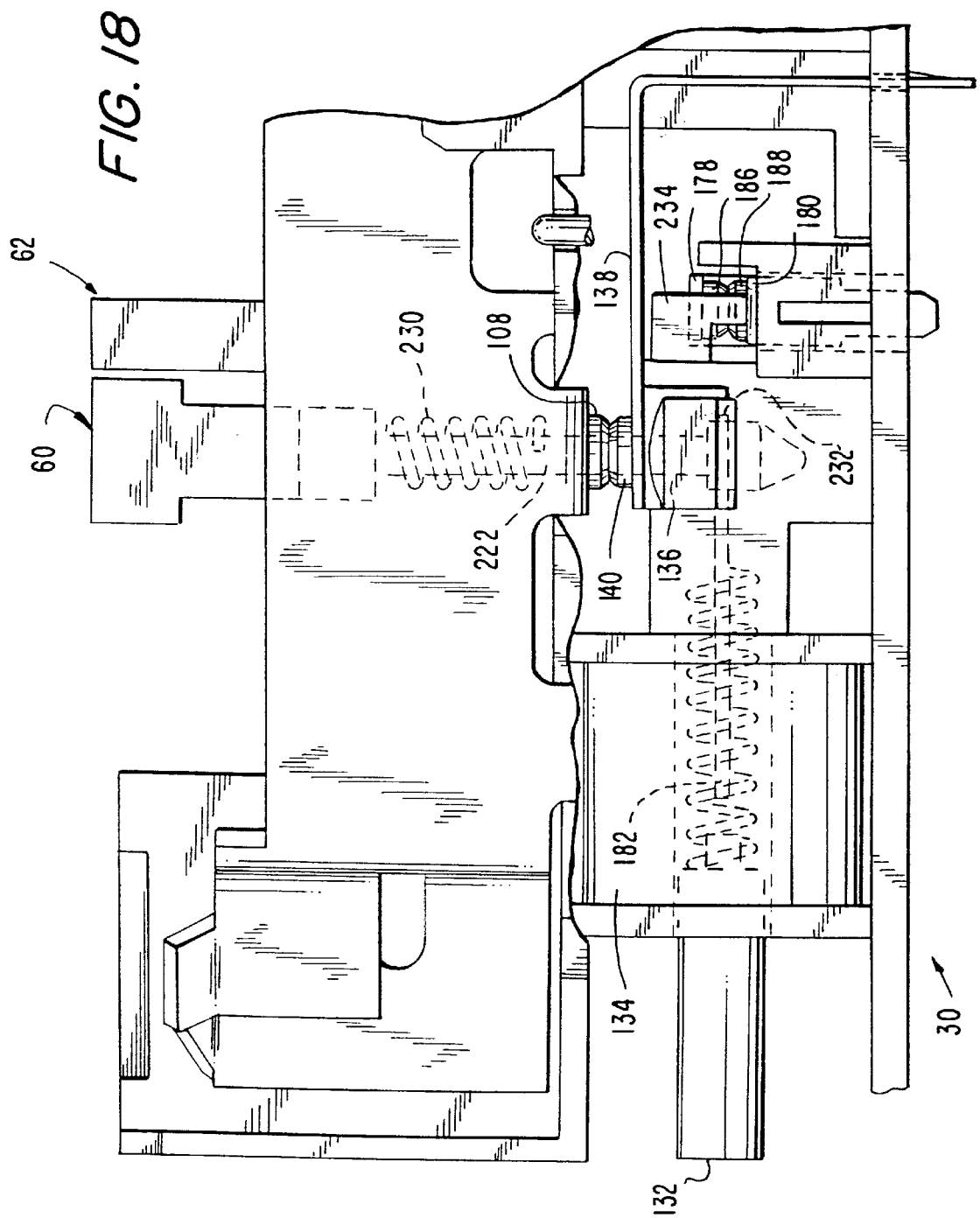
FIG. 18 is a side elevational view of the device according to FIG. 17.

The reset button 60 is shown in FIG. 16. Reset button 60 has a top member 218 from which depend side members 220. Also extending from top member 218 is a latch lever 222 which ends in a latch pin 224. Latch pin 224 is generally pointed at its free end 228. The diameter of latch pin 224 is greater than the diameter of the latch lever 222 resulting in a latch shoulder 226. A reset spring 230 surrounds latch lever 222 as shown in FIG. 17. FIGS. 17 and 18 show the GFCI 30 in its reset position. FIG. 17 is a rear view while FIG. 18 is a side elevational review. The surrounding structure is shown in light line to permit the switching components of GFCI 30 to stand out. In FIG. 18 the plunger 132 extends out of the solenoid coil 134 and the latch plate 182 is drawn to the left of the figure so that a smaller end of the oval aperture 194 engages the latch lever 222. The latch pin 224 cannot be drawn through oval aperture 194. The leading end 232 of latch plate 182 rests upon the latch shoulder 226 and also is positioned under lifter 136. The reset spring 230 urges the latch lever 222 upwardly causing the lifter 136 to also move upwardly. This upward movement causes the movable contact arms 138 to also move upwardly bringing movable contacts 140 into contact with fixed contacts 108, 112 (see FIG. 17). The extension 234 of lifter 136 moves away from its contact with auxiliary movable arm 180 and the upwardly braised auxiliary movable arm 180 causes its auxiliary movable contact 188 to engage auxiliary fixed contact 186 on auxiliary fixed arm 178 and thus supply power to the PCB.

Figure 19:
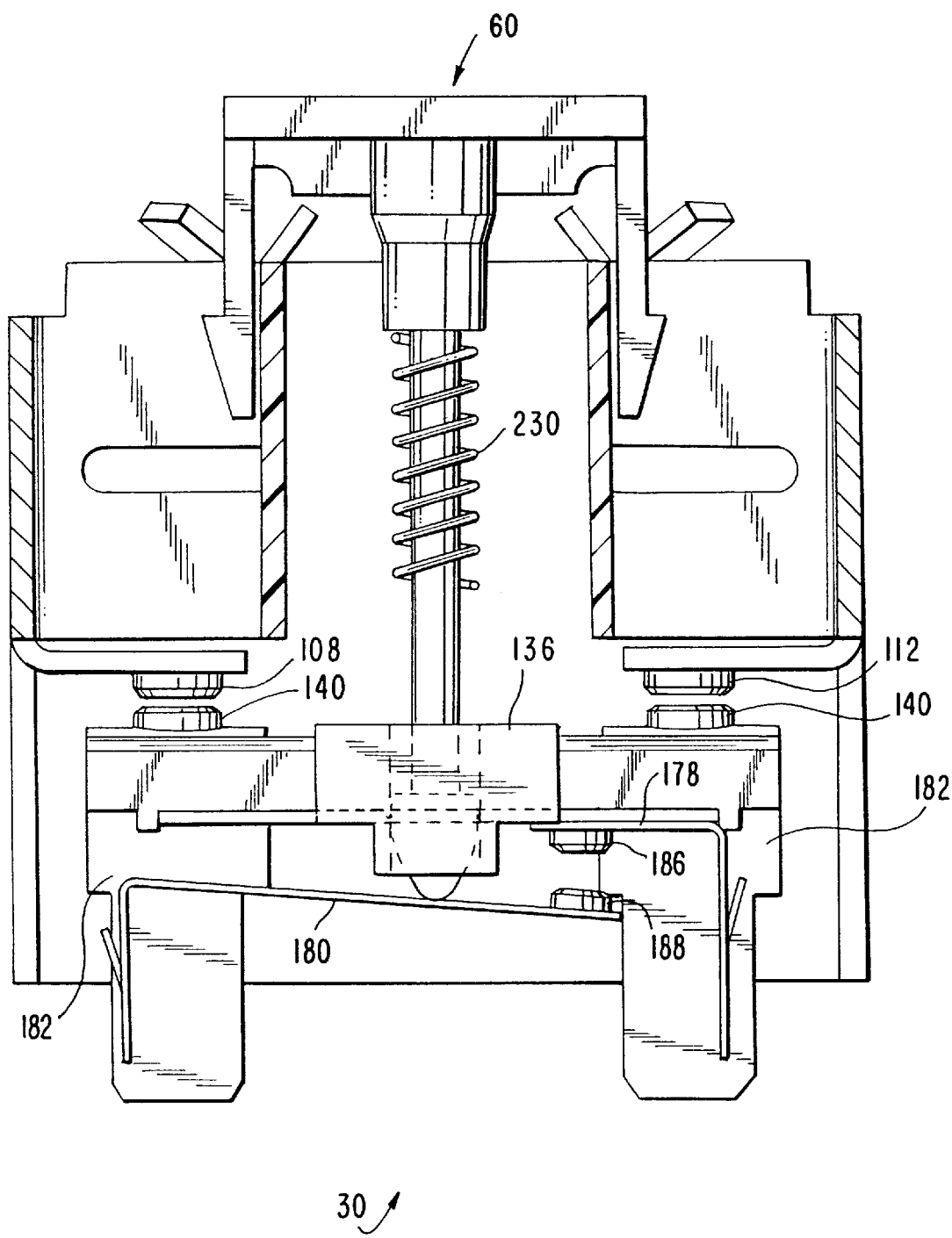
FIG. 19 is a front elevational view of the components of FIG. 17 in the tripped condition.

In response to an internal or external fault or in response to a test employing test button 62, the GFCI 30, if working properly will go to a trip state shown in FIGS. 19 and 20 wherein both the main circuits and the auxiliary circuit will be opened. The presence of the trip condition is signaled by the circuits of the PCB. A signal will be supplied to the solenoid coil 134 which draws the plunger 132 further into solenoid coil 134. Plunger 132 causes the latch plate 182 to move to the right in FIG. 20 and place the central portion of oval aperture 194 over latch pin 224. In this position leading end 232 of the latch plate 182 not longer engages the latch shoulder 226 and the latch lever 222 is free to move through the oval aperture 194. As a result there is nothing to hold the movable contacts 140 on movable contact arms 138 in contact with fixed contacts 108, 112 on the fixed arms 106, 110, respectively. The movable contact arms 138, biased downwardly bear upon the lifter 136 moving it downwardly separating contacts 108, 112 and 140. The extension 234 bears against auxiliary movable arm 180 and causes its downward movement separating the auxiliary movable contact 188 from the auxiliary fixed contact 186 and opening the auxiliary circuit to supply power to the circuits on the PCB. The reset button 60 pops up as a result of the action of reset spring 230 to indicate that the GFCI 30 needs to be reset.

In addition to the pop-up of the reset button 60, the GFCI has a dual color indicator lamp means 64 and a priezo resonator 236 driven by an oscillator on the PCB (not shown) to produce an audible output. By selecting the oscillator frequency of 3.0 KHZ±20% and controlling the time of operation of the oscillator, the audible signal shall be active for 0.10 second and inactive for 2 seconds. FIG. 21 shows the various combinations of light color, light flashing speed and beeper sound which can be produced to show various states of the GFCI 30. A supervisory signal that indicates that the GFCI 30 is working is provided for the first 25 days of the GFCI 30 cycle. It is recommended that the GFCI 30 be tested and reset every 30 days to ensure that the GFCI 30, is working properly.

However, for the most part this instruction is disregarded. To encourage the testing of the GFCI 30 the various lights and beeper approach is employed. At the end of 25 days the slow flashing green light which signaled the device as workings changes to a faster blink. The supervisory or slow blink is 0.10 seconds "on" and 15 seconds "off". The faster blink is 0.10 seconds on and 0.9 seconds off. This fast blink extends for five days at which time both filaments of the indicator lamp means 64 are energized to produce an amber light which is blinked at the fast blink rate. If the power comes on reset the amber light will also blink at the fast rate until the supervisory condition is reached. The time periods are established by a counter and a clock generator on the PCB. If an external fault is detected the amber light is lit and the audible signal is generated. The GFCI 30 will need to be reset. If the fault is in the GFCI 30 itself, for example the solenoid coil 134 is burned out, then the red filament of the indicator lamp means 64 is activated and the audible signal is generated. The GFCI 30 will have to be replaced if the fault is in the GFCI 30.

While there has been shown and described and pointed out the fundamental novel features of the invention as applied to the preferred embodiment, as presently contemplated for carrying them out, it will be understood that various omissions and substitutions and changes of the form and details of the device illustrated and in its operation may be made by those skilled in the art, without departing from the spirit of the invention.

What is claimed is:

1. A switching device for selectively interrupting electrical connections between two input and two output conductors, the switching device comprising:
   a housing having an outer shell;
   two fixed contacts, one for each of said two output conductors within said housing;
   two first movable contacts, one for each of said two input conductors, within said housing, to be selectively moved into contact with an associated first contact;
   a lifter member to selectively move both of said two first movable contacts into contact with an associated first fixed contact;
   a reset lever having a reset button at a first end and a latch pin at a second end;
   a latch spring about said reset lever to urge said reset lever towards said housing outer shell;
   a latch plate for selectively engaging said latch pin; said latch plate being movable between a first position in contact with said latch pin to retain said lifter member in contact with said first movable contacts which are in turn in contact with said first fixed contacts and a second position wherein said latch pin is free to move through said lifter member under the influence of said latch spring and permits the separation of said first movable and first fixed contacts;
   a printed circuit board mounted to the housing;
   an indicator lamp mounted on the printed circuit board and capable of producing a plurality of colors whereby the indicator lamp can be blinked at regular intervals while producing any one of the plurality of colors or any combination of the plurality of colors;
   an audible device mounted on the printed circuit board where the audible device is capable of generating an audible signal; and
   the indicator lamp is caused to blink at a certain rate and the audible device is caused to generate a certain audible signal to indicate a certain state of the switching device.

2. A switching device, as claimed in claim 1, wherein said first movable contacts displace said lifter member to open said two first movable contacts with respect to said associated first fixed contacts when said latch plate is in said second position.

3. A switching device, as defined in claim 1, further comprising:
   a) a plunger coupled to said latch plate to control the position of said latch plate; and
   b) a solenoid having two input terminals for selectively receiving thereout a trip current to cause said solenoid to act as a magnet when trip current is applied to said two input terminals and draw said plunger into said solenoid and cause said latch plate to move to said second position and when no trip current is applied to said two input terminals allow said latch plate to be moved to said first position.

4. A switching device, as defined in claim 1, further comprising:
   a) a reset spring coupled to said latch plate to move said latch plate from said second position to said first position.

5. A switching device as defined in claim 3, further comprising:
   a) a reset spring coupled to said latch plate and said plunger to move said latch plate from said second position to said first position in the absence of trip current to said two input terminals of said solenoid.

6. A switching device, as defined in claim 5, wherein said reset spring is two reset springs one connected between said latch plate and said plunger and a second connected between said lifter member and said latch plate.

7. A switching device, as defined in claim 1, further comprising:
   a) a second fixed contact;
   b) a second movable contact;
   c) an extension on said lifter member to engage said second movable contact to cause said second movable contact to engage said second fixed contact when said latch plate is in said first position and permit separation of said second movable contact from said second fixed contact when said latch plate is in said second position.

8. A switching device, as defined in claim 3, further comprising:
   a) a test switch coupled to said solenoid to impress trip current thereon to move said latch plate from said first position to said second position.

9. The switching device of claim where the indicator lamp is a dual color lamp which can produce three distinct colors.

10. The switching device of claim 1 where the indicator lamp is caused to blink at two different rates.

11. The switching device of claim 1 where the state of the switching device can be determined from the color and blinking rate of the indicator lamp and the presence or absence of an audible signal.

12. The switching device of claim 1 where the indicator lamp is caused to blink at a first rate in a first color and the absence of the audible signal together show a successful test sequence of the switching device has been completed.

13. The switching device of claim 1 where the indicator lamp is caused to blink at a second rate, faster than the first rate, in a first color and the absence of the audible signal together indicate the time for testing the switching device is approaching.

14. The switching device of claim 1 where the indicator lamp is caused to blink at a second rate and in a second color and the absence of the audible signal to show that the time for testing the switching device has arrived.

15. The switching device of claim 1 where the indicator lamp is caused to blink at a second rate and in a second color and in the presence of an audible signal to show that the switching device has tripped due to an external fault.

16. The switching device of claim 1 where the indicator lamp is caused to blink at a second rate in a third color and in the presence of an audible signal to show that the switching device has tripped due to an internal fault in the switching device.

17. The switching device of claim 1 where the indicator lamp is caused to blink at a second rate in a second color and in the absence of audible signal to show that power is on upon reset of the switching device.

18. The switching device of claim 1 where the indicator lamp has a first filament which when activated produces a first color, a second filament which when activated produces a second color and the indicator lamp produces a third color when both filaments are activated.

* * * * *